March 3, 1970  K. H. SCHRODER  3,498,647
CONNECTOR FOR COAXIAL TUBES OR CABLES
Filed Dec. 1, 1967  2 Sheets-Sheet 1

INVENTOR.
KARL H. SCHRODER
BY H. H. Losche
Paul S. Collignon
Attorneys

INVENTOR.
KARL H. SCHRODER
BY H. H. Loscke
Paul S. Collignon
Attorneys

# United States Patent Office 3,498,647
Patented Mar. 3, 1970

3,498,647
CONNECTOR FOR COAXIAL TUBES OR CABLES
Karl H. Schroder, San Lorenzo, Calif.
(15962 Gramercy Drive, San Leandro, Calif. 94578)
Filed Dec. 1, 1967, Ser. No. 687,375
Int. Cl. F16l *17/02*
U.S. Cl. 285—343                                       2 Claims

ABSTRACT OF THE DISCLOSURE

A connector assembly having first and second cylindrical rings with mating tapered surfaces, said rings being disposed with a compression nut which threadedly engages with a mating assembly and having locking means for attaching said rings together after one ring telescopes a predetermined distance inside the other ring.

BACKGROUND OF THE INVENTION

The present invention relates to an improved connector for connecting coaxial tubes or cables together and is especially designed so as to create a minimum of distortion or damage to a tube or cable, and yet, provide a positive electrical connection and permit pressurization of the tubes or cables. The design of the connector is such that repeated coupling and uncoupling will not damage either the connector itself or the tubes or cables being conncted.

Various devices have been employed for coupling coaxial cables or tubes. One such device is shown in U.S. Patent 3,109,052, entitled, "Connector For Coaxial Cables," which issued Oct. 29, 1963, to Leo Dumire and George Edlen. This patented device employs an anchor comprised of a sheet metal sleeve having a plurality of internally extending small, sharp, hollow, tubular projections, which are adapted to be embedded in the wall of the pipe, cable, tubing or other structure to which the anchor is to be applied. The bases of the hollow projections are closed, as by a skin or cylinder overlying the exterior of the sleeve. In addition, along at least a portion of their length said hollow projections are formed with completely circumambient walls. This anchor is applied to a metal jacketed coaxial cable (or to a malleable metal pipe, rod, or the like) by being telescopically slipped over the end thereof to a desired location, and radially compressed or crimped thereon, causing the small hollow projections to penetrate or embed in the outer metal jacket of the cable. As the thin walls of the hollow projections penetrate the metal of the cable jacket, these projections become filled with the metal of the cable jacket encompassed by the penetrating walls.

Another device for connecting cylindrical rods or tubes together is shown in U.S. Patent 3,010,747, which issued Nov. 28, 1961, to Lewis A. Bondon. A compression nut is provided with internal threads that connects with a mating assembly, and an internally tapered ring and a mating externally tapered longitudinally split ring are provided inside the compression nut. The split ring is provided with inwardly extending teeth which grip a cylindrical member when the compression nut is tightened to a mating assembly.

An inherent disadvantage in all heretofore known connector devices for coupling tubes or cables is that each time the connector assembly is coupled and uncoupled, some damage is done to the tubes or cables being connected, and each time the inner gripping sleeve seeks a new gripping location. After several such couplings and uncouplings, the tubes or cables are damaged to such an extent that they must be replaced.

SUMMARY OF THE INVENTION

The present invention is comprised of a compression nut that is provided with an internally threaded portion which is engageable with a mating connector. First and second cylindrical rings are mounted within the compression nut and these rings are provided with tapered surfaces that provide a wedging action. The first ring is provided with a circumferential groove on its internally tapered surface as the second ring is provided with a circumferential groove on its externally tapered surface. A snap ring engages the two circumferential grooves after the second ring telescopes a predetermined distance within the first ring. Locking means are also provided for locking together the compression nut and the first cylindrical ring.

The second cylindrical ring is slotted, thereby forming cantilever fingers which are provided with inwardly extending teeth to grip a cylindrical tube or cable. Once the second cylindrical ring grips a tube or cable, the first and second rings become locked together and the second cylindrical ring remains locked to a tube or cable during repeated couplings and uncoupling of the compression nut with a mating connector.

It is therefore a general object of the present invention to provide an improved connector assembly for connecting cylindrical tubes or cables together.

Other objects and advantages of the present invention will be readily appreciated as the same becomes better understood by reference to the following detailed description when considered in connection with the accompanying drawings.

DESCRIPTION OF THE PREFERRED EMBODIMENT

Figure 1:
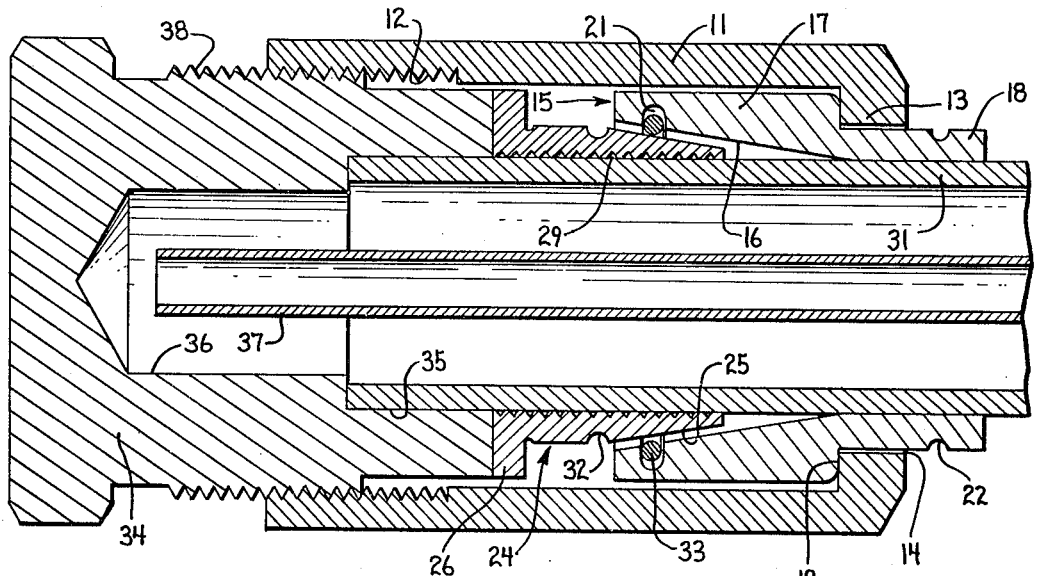
FIGURE 1 is a longitudinal sectional view of a connector embodying the principles of the present invention, and being partially connected to a special tool.
Figure 2:
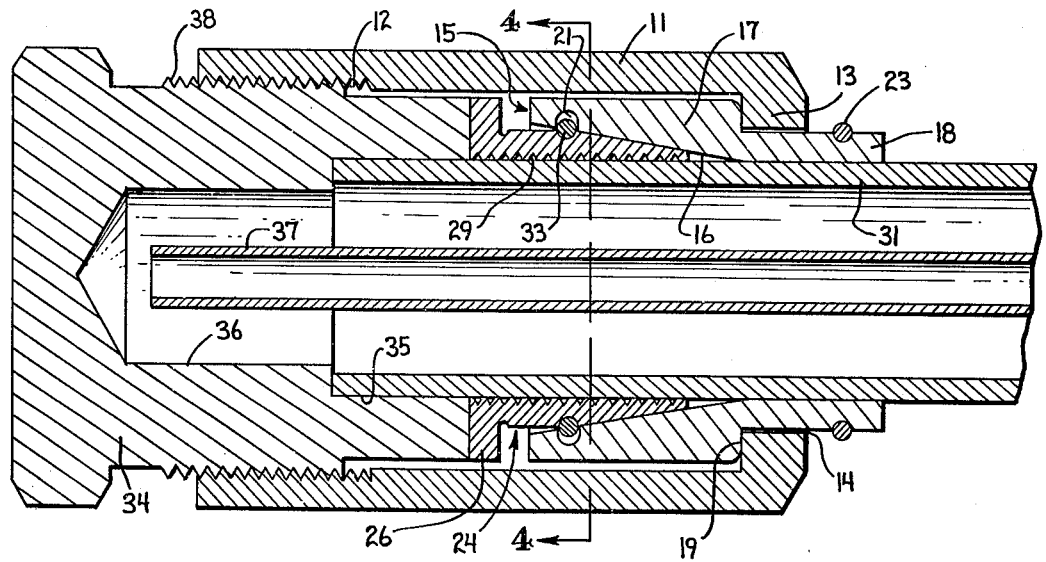
FIGURE 2 is a longitudinal sectional view similar to FIGURE 1 showing a connector fully connected to a special tool.
Figure 3:
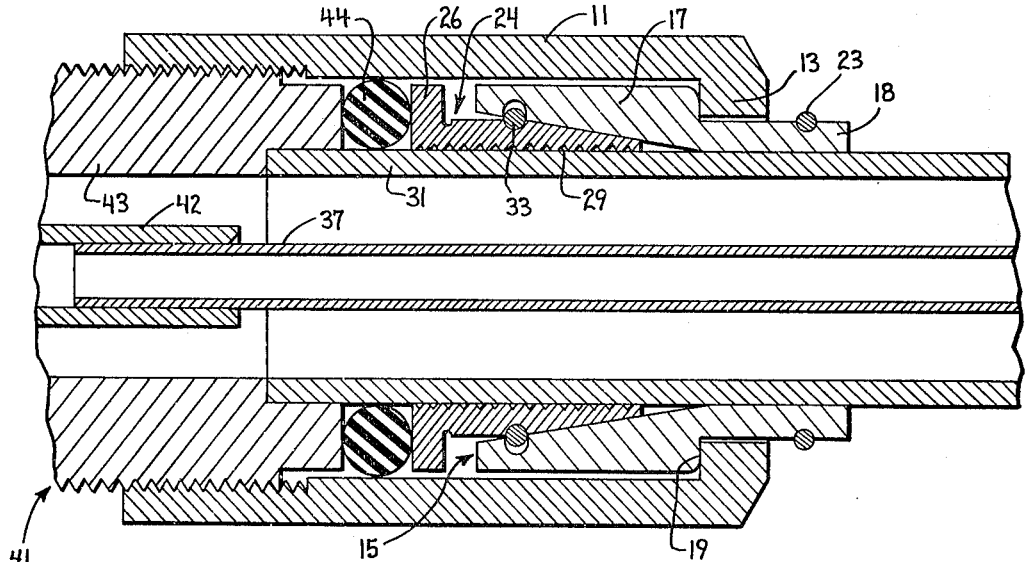
FIGURE 3 is a longitudinal sectional view of a connector embodying the principles of the present invention, and showing the connector connected to a mating connector.
Figure 4:
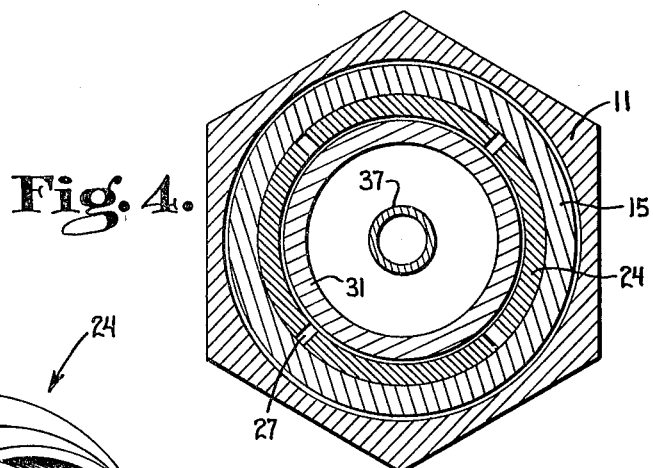
FIGURE 4 is a sectional view taken on line 4—4 of FIGURE 2.

Referring now to the drawings, wherein like reference characters designate like or corresponding parts throughout the several views, there is shown a compression nut 11 that is provided with an internally threaded portion 12 in one end and end wall 13 at the other end. End wall 13 is provided with a central aperture 14. A first cylindrical ring 15, having an internally tapered surface 16, has an enlarged diameter portion 17 that is positioned within compression nut 11, and a reduced diameter portion 18 extends through and beyond aperture 14. Enlarged diameter portion 17 and reduced diameter portion 18 form a shoulder 19 which is engageable with the inside surface of end wall 13. A first circumferential groove 21 is provided in tapered surface 16, near one end of enlarged diameter portion 17, and groove 21 is slightly deeper than its width dimension, so that a ring of circular cross-section can be positioned in groove 19 without extending beyond tapered surface 16. As best shown in FIGURES 1, 2, and 3, of the drawings, a circumferential groove 22 is provided in reduced diameter portion 18 and snap ring 23 is positioned in groove 22. It can be seen that shoulder 19 and snap ring 22, which are on oposite sides of end wall 13, provide stop means so that compression nut 11 and ring 15 are locked together.

Figure 5:
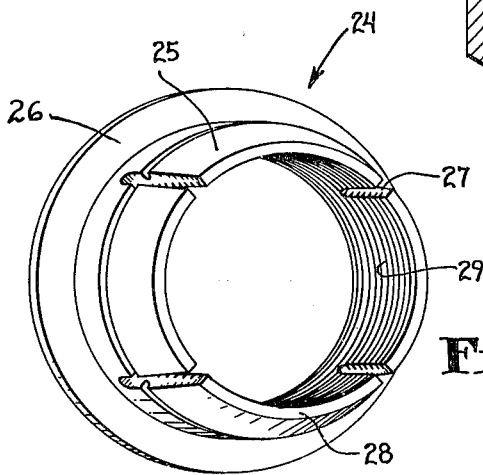
FIGURE 5 is a perspective view showing a slotted cylindrical gripping ring.

A second cylindrical ring 24 is positioned within compression nut 11, and ring 24 is provided with an externally tapered surface 25 on one end and flange 26 on the other end. Surface 25 is sloped to mate with the internally tapered surface 16 of ring 15. As best shown in FIGURE 5 of the drawings, ring 24 is provided with four slots 27 that form four cantilever fingers 28 thereby causing ring 24 to function as a collet. A plurality of inwardly extending circumferential teeth 29 are provided on the inner surface of ring 24 to facilitate the gripping of a cylindrical member 31, such as a tube or coaxial cable. A circumferential groove 32 is provided in the outer surface of ring 24 at one end of tapered surface 25, and the depth dimension of groove 32 is approximately one-half its width dimension. As shown in FIGURES 2 and 3 of the drawings, a snap ring 33 seats in groove 32 and extends into groove 21 whereby rings 15 and 24 are locked together.

Referring now to FIGURE 1 of the drawings, a tool 34 might be provided to facilitate the assembly of a connector embodying the principles of the present invention. Tool 34 is provided with a first counterbore 35 that permits cylindrical member 31 to be inserted a predetermined distance therein, and a second counterbore 36 is provided in tool 34 to permit the inner cylindrical member 37 to extend into tool 34. Tool 34 is provided with threads 38 that are engageable with threaded portion 12 of compression nut 11.

In assembly, cylindrical member 31 is seated the full depth in counterbore 35, and the second cylindrical ring 24 is moved outwardly along member 31 until flange 26 engages the end of tool 34, as shown in FIGURE 1 of the drawings. Compression nut 11 is threadedly engaged with threads 38 on tool 34 and during advancement of nut 11, end wall 13 engages shoulder 19 of ring 15 and moves ring 15 relative to ring 24. When tapered surfaces 16 and 25 come into engagement, snap ring 33 is expanded and moves fully into groove 21. When groove 21 becomes aligned with groove 32, snap ring 33 contracts and snaps into groove 32. The depth of groove 32 is such that approximately one-half of ring 33 protrudes into groove 21 thereby locking rings 15 and 24 together. The wedging action between tapered surfaces 16 and 25 causes teeth 29 to firmly grip cylindrical member 31 thereby securing ring 24 to member 31.

Before compression nut 11 is unthreaded from tool 34, snap ring 23 is seated in groove 22. Upon unscrewing nut 11, end wall 13 engages ring 23 thereby causing member 31 to be withdrawn from counterbore 35 of tool 34. The withdrawing force, which is applied by unscrewing nut 11 is transferred to snap ring 23, ring 15, snap ring 33, ring 24, and then to cylindrical member 31.

Referring now to FIGURE 3 of the drawings, there is shown a connector embodying the principles of the present invention, engaged with a mating connector 41. Inner cylindrical member 37 is engaged with female member 42 and member 31 is engaged with female member 43 of mating connector 41. An O-ring 44 is positioned between flange 26 of ring 24 and the end of mating connector 41 to provide sealing of the connector assembly.

It should be understood that the use of tool 34 is not essential to the assembly of the improved connector described herein, but rather is a convenient means to properly position ring 24 on member 31. Once ring 24 becomes secured to member 31, the connector assembly can be repeatedly coupled and uncoupled to mating connector 41 without causing any damage or distortion to member 31.

I claim:
1. A connector assembly for threadedly connecting to a mating assembly and providing connections between cylindrical members comprising:
 a compression nut having an internally threaded portion in one end, and an end wall with a central aperture in the other end,
 a first cylindrical ring having an enlarged diameter portion and a reduced diameter portion thereby forming a shoulder engageable with said end wall of said compression nut, said enlarged diameter portion having an internally tapered surface, and said reduced diameter portion passing through and extending beyond said central aperture in the end wall of said compression nut,
 a second cylindrical ring having an externally tapered surface mating with said internal tapered surface of said first cylindrical ring, said second cylindrical ring having a plurality of longitudinal slots therein which provide a plurality of resilient externally tapered segments, said second cylindrical ring being provided with a plurality of inwardly extending teeth,
 a first circumferential groove on said internally tapered surface of said first cylindrical ring,
 a second circumferential groove on said externally tapered surface of said second cylindrical ring, and
 a snap ring seated in said second circumferential groove on said externally tapered surface with a portion of said snap ring extending beyond said externally tapered surface and into said first circumferential groove on said internally tapered surface thereby locking said first cylindrical ring with said second cylindrical ring.

2. A connector assembly as set forth in claim 1 having means for locking said first cylindrical ring to said compression nut.

References Cited

UNITED STATES PATENTS 2,839,595   6/1958   Felts et al.
3,010,747  11/1961  Bondon _____ 287—116
3,117,357   1/1964   Carver _____ 339—177 XR DARRELL L. CLAY, Primary Examiner U.S. Cl. X.R.

174—75, 94; 285—133; 339—177, 273